July 4, 1933.  O. SCHMIDT  1,916,810
ELECTRICALLY HEATED BAKE OVEN
Filed April 3, 1930
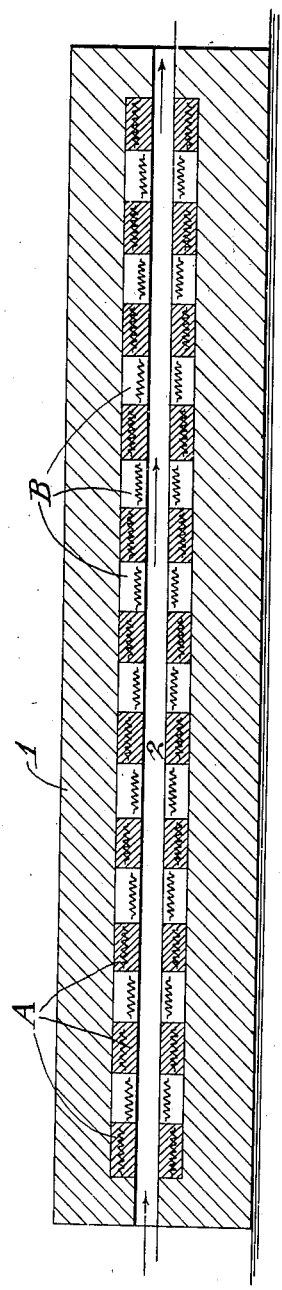
INVENTOR
OTTO SCHMIDT
BY
ATTORNEY Patented July 4, 1933

1,916,810

UNITED STATES PATENT OFFICE

OTTO SCHMIDT, OF FEUERBACH, GERMANY, ASSIGNOR TO BAKER PERKINS COMPANY, INC., OF SAGINAW, MICHIGAN, A CORPORATION OF NEW YORK

ELECTRICALLY HEATED BAKE OVEN

Application filed April 3, 1930. Serial No. 441,190.

My invention relates to improvements in electrically heated ovens which bake by accumulated or stored-up heat. These ovens are equipped with heat absorbing and retaining elements which are heated as a preliminary step, the actual baking operation being performed by the heat which has been stored up in the elements. This kind of oven has come into use in certain localities where, for example, night rates for electric power are less than the day-time rates, and it is desired to bake during the day-time hours only, because of labor laws or other reasons.

In prior ovens that baked entirely by stored-up heat, the temperature of course gradually decreased. However, these ovens were practical in bakeries having a small daily output of goods, when used in the following manner:

The baking was done in batches, goods requiring the highest temperature being put into the oven first. The pieces in this first batch were ready at the same time and they were removed simultaneously. The oven temperature then being somewhat lower, the next batch was allowed to bake for a longer time than the first batch and the pieces of the second batch were likewise baked uniformly since they were baked an equal length of time. After this second batch, if the oven temperature was too low for baking the first kind of product, a product for which a lower temperature sufficed was baked next. As the temperature dropped lower still, other kinds of goods could be baked in like manner.

From the foregoing it can be seen that in a small shop where only a few batches of any one kind of product fills the day's requirements and where a uniform speed of output is not necessary an oven which bakes by stored heat alone is adequate.

The object of my present invention is to render the economies of the above described system of heating in the batch type of oven available in traveling ovens of large capacity having an elongated baking chamber or passage through which a conveyor carries the goods to be baked.

Certain inherent difficulties rendered impracticable the heating of a traveling oven by stored heat alone.

One difficulty arises as follows: To justify the large capital investment in a traveling oven it is necessary that it be used in the continuous production of large quantities of one kind of product. Since its conveyor speed must be timed-in with the speed of the entire line of dough-handling and loaf-preparing machinery of the bakery, and accordingly must be uniform during a baking run, the baking temperature must be uniform throughout the baking period.

Another difficulty lies in the fact that the feed-in end of the baking passage requires more heating capacity than the rest of the oven, for it is here that the loaves are heated up to baking temperature and most of their contained water is evaporated. If a traveling oven were to bake entirely by accumulated heat this first part of the baking passage would soon become very much cooler than the last part, while in practice it must be as hot or hotter than the last part.

My invention comprises a combination of electrically heated heat-accumulating elements together with groups of non-accumulating heating elements placed along the baking passage of a traveling oven. Preferably the heat accumulating elements are placed alternately with the non-accumulating heating elements lengthwise of the passage. In other words, there are alternate sections along the wall of the passage, one equipped with an electrically heated element to absorb and retain heat and then radiate it, the next equipped with a direct heating element having little or no heat retaining capacity.

The drawing is a diagrammatic representation of a traveling oven equipped with my combination of heat accumulating and direct heating elements. 1 indicates the oven, 2 the baking passage, A the heat accumulating elements, and B the non-accumulating heating elements.

The heat accumulating elements A are made of soapstone, fire clay, or any other suitable material having a high thermal capacity and good radiating properties. They are heated by electrical resistance units enclosed within them or otherwise closely associated with them. The non-accumulating heating elements B may be any conventional type of electrical resistance such as have heretofore been used for heating ovens.

The operation of my invention is as follows:

The units A are heated during the night, or the period of low current cost, and their current supply is turned off in the morning. The heat so accumulated is used for baking in the day time, during the period of high cost of current, no current being used until the oven temperature begins to drop below the minimum required for the material being baked. As units A gradually cool, some or all of the elements B are turned on as may be required to maintain the desired baking temperature. These direct heating elements can be controlled by thermostats (not shown) arranged in any desired manner to automatically maintain the proper temperature in different sections of the baking passage.

Because of their negligible heat-retaining capacity, the direct heating units B give up virtually all of their heat as fast as it is generated directly to the atmosphere of the oven and to the bread being baked. Consequently when these units are turned off at the end of a baking run very little heat is retained by them. The oven consequently obtains the greater part of its baking heat from the cheap night-time electric current, and uses only the minimum quantity of relatively expensive day-time current necessary to successful baking.

Having thus described my invention, what I claim and desire to secure by Letters Patent is:

1. In a traveling oven, an elongated baking passage and a conveyor therein, electrically heated heat accumulators, located at spaced intervals along said baking passage in proximity to the conveyor and non-accumulating electric heating elements located along said passage in the spaces between said heat accumulating elements.

2. In a traveling oven, an elongated baking passage and a conveyor therein, electrically heated heat accumulators located along the top and bottom of said baking passage in proximity to the conveyor and non-accumulating electric heating elements located between said heat accumulators along the top and bottom of said passage also in proximity to said conveyor.

In testimony whereof, I affix my signature.

OTTO SCHMIDT.